(12) United States Patent
Yamamoto

(10) Patent No.: US 8,194,314 B2
(45) Date of Patent: Jun. 5, 2012

(54) BINOCULARS

(75) Inventor: Mitsuo Yamamoto, Yokohama (JP)

(73) Assignee: Nikon Vision Co., Ltd., Tokyo (JP)

( * ) Notice: Subject to any disclaimer, the term of this patent is extended or adjusted under 35 U.S.C. 154(b) by 0 days.

(21) Appl. No.: 12/500,462

(22) Filed: Jul. 9, 2009

(65) Prior Publication Data
US 2009/0273832 A1 Nov. 5, 2009

Related U.S. Application Data

(63) Continuation of application No. PCT/JP2008/050464, filed on Jan. 9, 2008.

(30) Foreign Application Priority Data

Jan. 11, 2007 (JP) ................................ 2007-003570
Jan. 11, 2007 (JP) ................................ 2007-003572

(51) Int. Cl.
*G02B 23/06* (2006.01)
(52) U.S. Cl. ........................................ 359/426
(58) Field of Classification Search .................. None
See application file for complete search history.

(56) References Cited

U.S. PATENT DOCUMENTS 4,818,086 A * 4/1989 Moore .......................... 359/414
6,335,825 B1 1/2002 Funatsu

FOREIGN PATENT DOCUMENTS

| JP | 08-194166 A | 7/1996 |
|---|---|---|
| JP | 10-197776 A | 7/1998 |
| JP | 2592717 | 1/1999 |
| JP | 11-202383 A | 7/1999 |
| JP | 2000-056237 A | 2/2000 |
| JP | 2000-249930 A | 9/2000 |
| JP | 2007-127690 A | 5/2007 |

OTHER PUBLICATIONS

Chinese Patent Application No. 200880001112.1—First Office Action issued Sep. 19, 2010.
Chinese Patent Application No. 200880001112.1—Second Office Action issued Sep. 21, 2011.
Japanese Patent Application No. 2007-003570—Office Action mailed Oct. 21, 2011.
Japanese Patent Application No. 2007-003572—Office Action mailed Oct. 21, 2011.

* cited by examiner

*Primary Examiner* — Derek S Chapel
(74) *Attorney, Agent, or Firm* — Miles & Stockbridge P.C.

(57) ABSTRACT

Providing a pair of binoculars that is able to prevent diopter from being changed after adjusting diopter difference by pushing down the focus knob after adjusting diopter difference so as not to touch the operating knob, and able to prevent the focus position from being changed after adjusting focus position by pulling out the focus knob to create a focus lock state after adjusting focus position.

16 Claims, 5 Drawing Sheets

BINOCULARS

CROSS-REFERENCE TO RELATED APPLICATION

This application is a continuation of International Application No. PCT/JP2008/050464 filed Jan. 9, 2008.

TECHNICAL FIELD

The present invention relates to a pair of binoculars.

BACKGROUND ART

Generally, a pair of binoculars includes various adjustment mechanisms such as a focusing mechanism, a diopter adjustment mechanism in addition to a pair of right and left lens barrels each including a telescopic optical system. With the diopter adjustment mechanism, diopter difference between right and left eyes of a user is adjusted. With this state, the user carries out focusing right and left telescopic optical systems by the focusing mechanism. After adjusting right and left diopter difference, even if the object to be observed is changed, the user can observe the object by just carrying out focusing unless the user is changed.

When the object to be observed is a fixed point locating near to infinity, or when the object to be observed is locating far away so as to be able to focus the object by means of accommodation of the user's eyes, the object is preferably observed by a fixed focus depending upon accommodation of naked eye or depth of field. Moreover, after adjusting focus, it is preferable that focusing is fixed, as a matter of course, during observation, and even in a state that a distance to the object is not near to infinity (see Japanese Utility Model Publication No. 2592717).

However, when an operation portion of the diopter adjustment mechanism that has already been adjusted is touched by mistake during observation, there is a danger that diopter difference goes wrong. When diopter difference goes wrong, diopter difference of right and left eyes has to be adjusted again, so that the observation has to be interrupted. Moreover, when the operation portion of the focusing mechanism is touched upon using binoculars, focus position may be changed.

DISCLOSURE OF THE INVENTION

The present invention is made in view of the aforementioned problems, and a first object of the present invention is to provide a pair of binoculars capable of preventing diopter difference from changing after adjusting diopter difference. A second object of the present invention is to provide a pair of binoculars capable of preventing focus position from changing after carrying out focusing.

In order to realize the aforementioned object, the first invention includes: a pair of lens barrels each holding a telescopic optical system including a focusing lens; a diopter adjusting mechanism that adjusts diopter difference of one of the telescopic optical systems with respect to the other of the telescopic optical systems by moving the focusing lens of the one of the telescopic optical systems along an optical axis of the one of the telescopic optical systems; a diopter adjustment wheel that moves the focusing lens of the one of the telescopic optical systems along the optical axis by operating the diopter adjusting mechanism by a rotational operation; and a diopter-adjustment-operation-preventing member that makes the diopter adjustment wheel either operable or inoperable.

The first invention makes it possible to prevent diopter difference from being changed after adjusting diopter difference.

The second invention includes: a pair of lens barrels each holding a telescopic optical system including a focusing lens; a focusing mechanism that moves both of the focusing lenses held by the pair of lens barrels, respectively, along the respective optical axes; a focusing operation portion that moves both of the pair of focusing lenses along respective optical axes by operating the focusing mechanism by a rotational operation; and a focus-position-change-preventing member that prevents a focus position of the telescopic optical system determined by the focusing mechanism from being changed.

The second invention makes it possible to prevent the focus position from being changed after adjusting focus position.

THE EMBODIMENT FOR CARRYING OUT THE INVENTION

An embodiment of the present invention is explained with reference to accompanying drawings.

Figure 1:
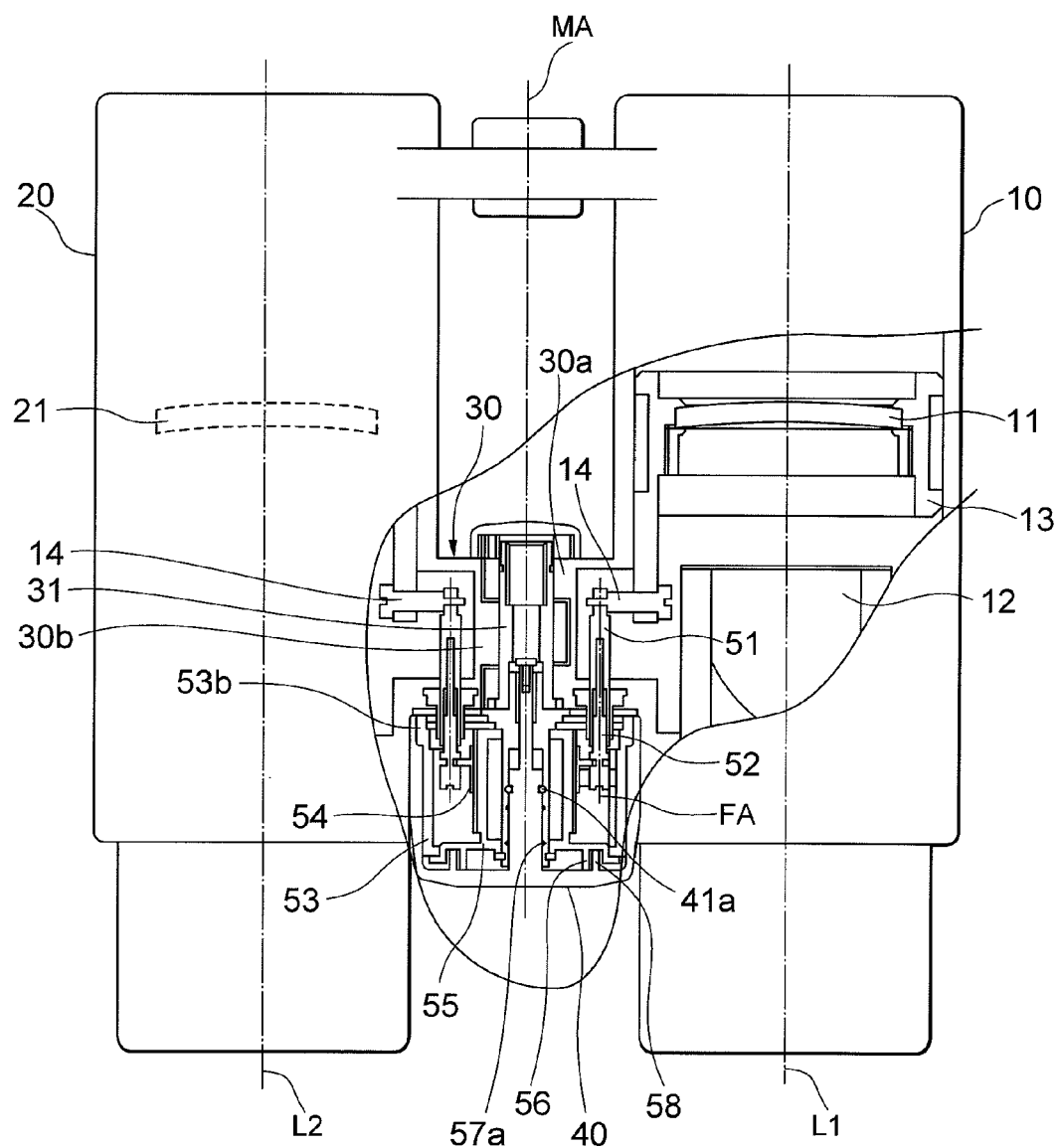
FIG. 1 is a partially cross-sectional view showing a pair of binoculars according to an embodiment of the present invention.
Figure 2:
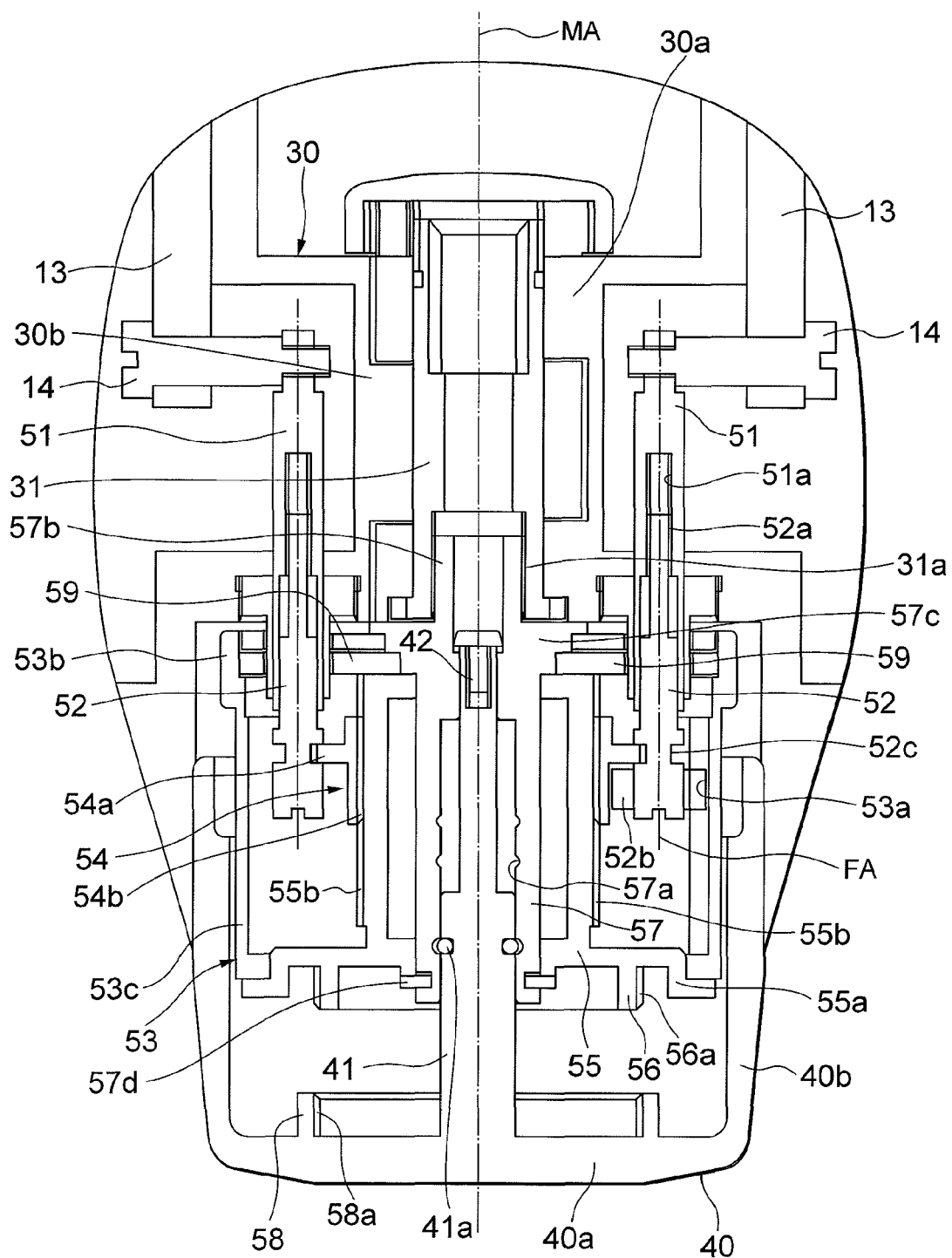
FIG. 2 is a partially enlarged view of FIG. 1.
Figure 3:
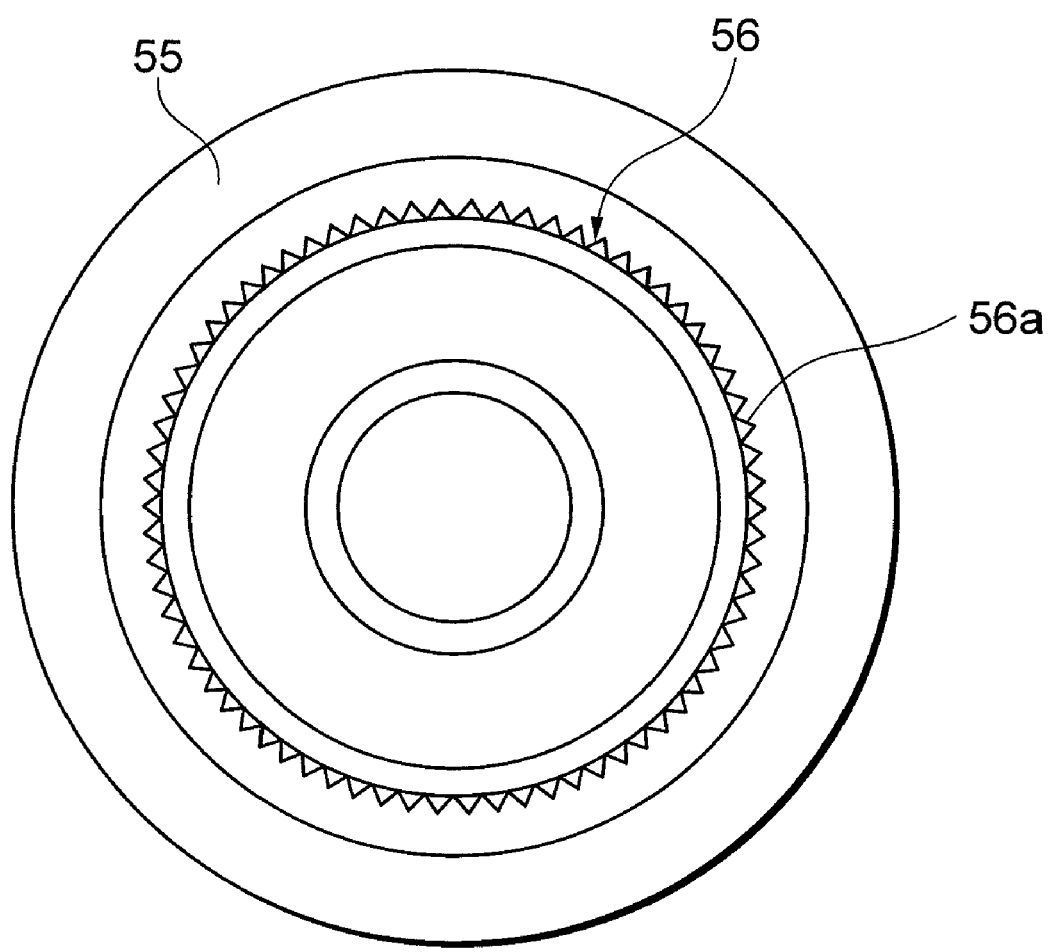
FIG. 3 is a side view showing a male lead ring seen from an internal gear side.
Figure 4:
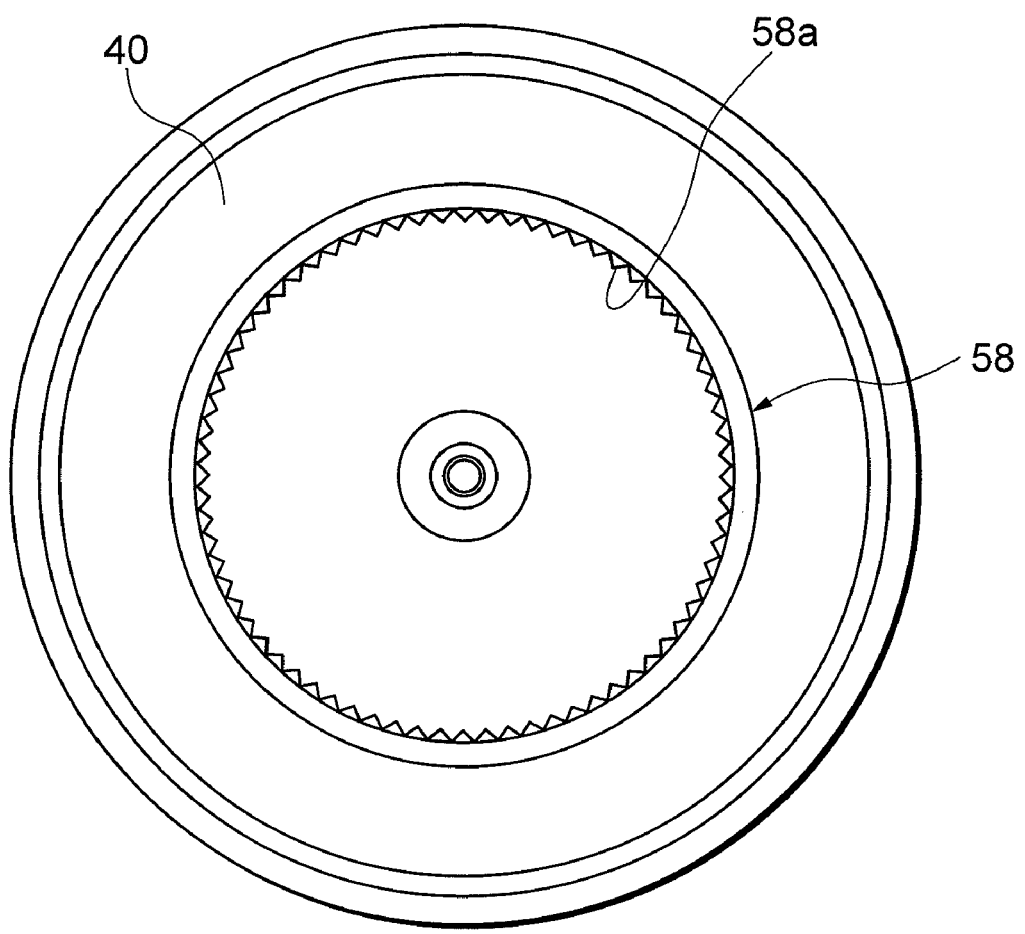
FIG. 4 is a side view showing a focus knob seen from a spur gear side.
Figure 5:
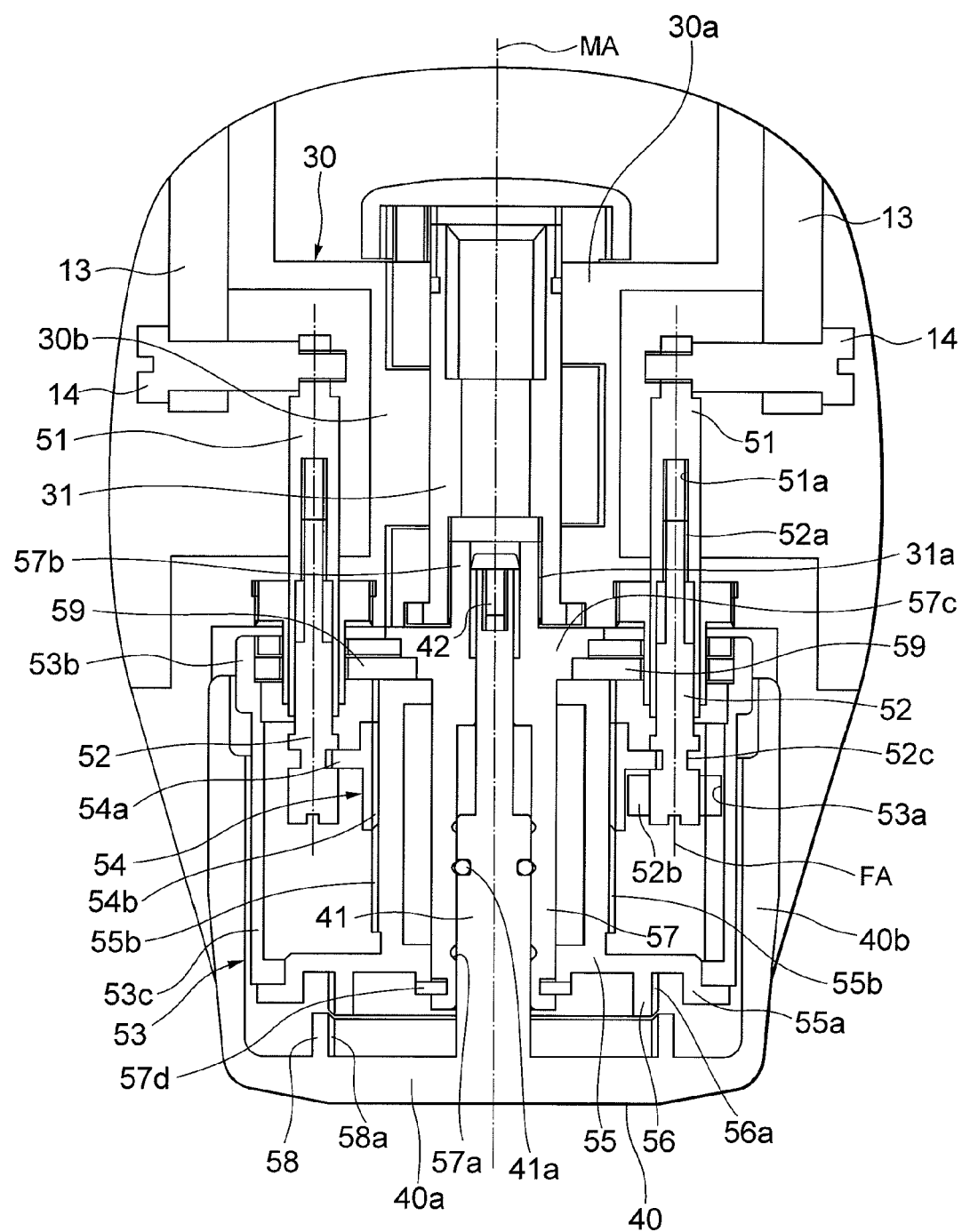
FIG. 5 is a cross-sectional view of a pair of binoculars.

FIG. 1 is a partially cross-sectional view showing a pair of binoculars according to an embodiment of the present invention. FIG. 2 is a partially enlarged view of FIG. 1. FIG. 3 is a side view showing a male lead ring seen from an internal gear side. FIG. 4 is a side view showing a focus knob seen from a spur gear side. FIG. 5 is a cross-sectional view of a pair of binoculars. FIG. 1 shows a state where the focus knob 40 is pushed down, FIG. 2 shows a state where the focus knob 40 is pulled up, and FIG. 5 shows a state where the focus knob 40 is located at an intermediate position.

In the following explanation, "left" and "right" denote when the binoculars are seen from the eyepiece side. In FIGS. 1, 2, 5, the eyepiece side comes lower side of each figure, and the objective lens side comes upper side of each figure.

The pair of binoculars includes a pair of lens barrels 10, 20 each of which a telescopic optical system is held therein, and a bridge portion 30 that is extended from both of the lens barrels 10, 20 and connects both of the lens barrels 10, 20. In the bridge portion 30, there are provided a diopter adjustment mechanism and a focusing mechanism described below. The diopter adjustment mechanism and the focusing mechanism are operated by a diopter adjustment wheel 53 and a focus operation portion, respectively.

The bridge portion 30 is composed of bridge members 30a, 30b integrally provided to respective lens barrels 10, 20, and a first intermediate tube 31 that is located between both lens barrels 10, 20 and positioned parallel to both lens barrels 10, 20. The bridge members 30a, 30b are formed, respectively, with holes (not shown) in respective directions of optical axes L1, L2 of the telescopic optical systems. The first intermediate tube 31 is inserted into the holes such that these holes lie in a row on the same axis. The bridge members 30a and 30b are connected in this manner through the first intermediate tube 31, and rotatable by a given angle centering on the first intermediate tube 31. Accordingly, by rotating a pair of lens barrels 10, 20 centering on an axis MA of the first intermediate tube 31, it becomes possible to adjust interpupillary distance.

The right lens barrel 10 holds the objective lens (not shown) disposed upside of FIG. 1, the eyepiece (not shown) disposed downside of FIG. 1, and a focusing lens 11 and an erecting prism 12 on the optical path between the objective lens and the eyepiece. The telescopic optical system is composed of the objective lens (not shown), the focusing lens 11, the erecting prism 12, and the eyepiece (not shown).

The left lens barrel 20 holds the objective lens (not shown) disposed upside of FIG. 1, the eyepiece (not shown) disposed downside of FIG. 1, and a focusing lens 21 and an erecting prism (not shown) on the optical path between the objective lens and the eyepiece. The telescopic optical system is composed of the objective lens (not shown), the focusing lens 21, the erecting prism (not shown), and the eyepiece (not shown).

A focusing lens frame 13 for holding the focusing lens 11 in the lens barrel 10 is connected to a right first focusing rod 51 disposed between the optical axis L1 of the telescopic optical system and the axis MA parallel to the optical axis L1 through a connecting pin 14, a focusing lens frame 13 for holding the focusing lens 21 in the lens barrel 20 is connected to a left first focusing rod 51 through a connecting pin 14 in the same manner.

The first focusing rod 51 is movable along an axis FA which is an axis (herein after called "a focusing axis") of the first focusing rod 51 (see FIG. 2), but not rotatable centering on the focusing axis FA. The focusing axis FA is parallel to the optical axes L1, L2. A female screw 51a capable of being screwed from the eyepiece side is formed on the first focusing rod 51. A second focusing rod 52 is disposed to the eyepiece side of the first focusing rod 51 on the same axis of the focusing axis FA. A male screw 52a is formed on the objective lens side tip of the second focusing rod 52. The male screw 52a of the second focusing rod 52 is rotatably screwed to the female screw 51a of the first focusing rod 51.

The diopter adjustment wheel 53 for operating diopter adjustment mechanism is provided outside of both of the right and left second focusing rods 52, 52 centering on the axis MA. The diopter adjustment wheel 53 is composed of an operating portion main body 53c having a cylindrical shape, and an operating knob 53b provided on one end of the main body 53c. An internal gear 53a is formed on internal circumference of the operating portion main body 53c.

A step portion is formed on the internal circumference of the operating knob 53b. An outer edge of a flat plate 59 having a disk shape is fitted to the step portion. The flat plate 59 is put between a second intermediate tube 57 and a locking projection 57d together with a male lead ring 55, and restricted movement along the optical axis. With this fitting, the operating knob 53b is rotatable centering on the axis MA along the outer edge of the flat plate 59 as a guide, but restricted movement along the optical axis to the objective lens side.

The eyepiece side tip of the operating portion main body 53c is fitted to a brim portion 55a formed on the outer edge of the eyepiece side tip of the male lead ring 55 explained later. With this fitting, the operating portion main body 53c is rotatable centering on the axis MA along the outer edge of the brim portion 55a of the male lead ring 55, but restricted movement along the optical axis to the eyepiece side.

With this configuration, the diopter adjustment wheel 53 is rotatable centering on the axis MA, but not movable in the optical axis direction L1, L2.

A gear 52b is formed in the circumferential direction on the eyepiece side tip of the right second focusing rod 52. The gear 52b is meshed with the internal gear 53a formed on the operating portion main body 53c of the diopter adjustment wheel 53. With this configuration, the right second focusing rod 52 is rotatable centering on the focusing axis FA together with the rotation of the diopter adjustment wheel 53.

By rotating the right second focusing rod 52, screwed depth of the right second focusing rod 52 with respect to the right first focusing rod 51 varies, so that relative distance in the optical axis direction L1, L2 adding the right first focusing rod 51 and the right second focusing rod 52 varies. Accordingly, relative positions in the optical axis direction L1, L2 of the right focusing lens frame 13, and the right first focusing rod 51 with respect to the position of the right second focusing rod 52 are determined in accordance with the screwed depth of the right second focusing rod 52 with respect to the right first focusing rod 51. The diopter adjustment mechanism is composed of the right second focusing rod 52, the right first focusing rod 51, the right connecting pin 14 and focusing lens 13.

On the eyepiece side tip of the left second focusing rod 52, a gear corresponding to the gear 52 is not formed. Accordingly, the left second focusing rod 52 is not meshed with the internal gear 53a formed on the inner circumference of the diopter adjustment wheel 53.

A female lead ring 54 is disposed inside of the right and left second focusing rods 52, 52 centering on the axis MA. A projection 54a projecting in a direction perpendicular to the axis MA is formed on the outer circumference of the female lead ring 54. The male lead ring 55 is disposed inside of the female lead ring 54 centering on the axis MA. The second intermediate tube 57 is disposed inside of the male lead ring 55 centering on the axis MA.

The second intermediate tube 57 is disposed to the eyepiece side of the first intermediate tube 31 that connects the bridge members 30a, 30b. The objective lens side tip of the second intermediate tube 57 protrudes in the axis MA direction, and a screw 57b screwing into the inner circumference of the first intermediate tube 31 is formed thereon. A protruding portion 57c protruding in a direction perpendicular to the axis MA and having step portions whose diameter becomes smaller toward the eyepiece direction is formed on the outer circumference of the objective lens side of the second intermediate tube 57.

The second intermediate tube 57 is restricted in movement in the optical axis direction L1, L2 by screwing the screw 31a of the first intermediate tube 31 with the screw 57b.

The objective lens side tip of the male lead ring 55 faces in the optical axis direction L1, L2 against the smaller diameter step portion of the protruding portion 57c of the second intermediate tube 57. The eyepiece side tip of the male lead ring 55 is fitted into the locking projection 57d integrally provided on the outer circumference of the eyepiece side of the second intermediate tube 57. Accordingly, the male lead ring 55 is restricted in movement in the optical axis direction L1, L2 by the protruding portion 57c and the locking projection 57d of the second intermediate tube 57.

As described above, the projection 54a projecting in a direction perpendicular to the axis MA is formed on the outer circumference of the female lead ring 54. A lead screw 55b is formed on the outer circumference of the male lead ring 55. The lead screw 54b of the female lead ring 54 is screwed with the lead screw 55b of the male lead ring 55. The male lead ring 55 cannot move in the optical axis direction L1, L2, but can rotate inside of the female lead ring 54 centering on the axis MA. The female lead ring 54 cannot rotate centering on the axis MA by a locking member (not shown), but can move in the optical axis direction L1, L2 by the rotation of the male lead ring 55.

A groove 52c is formed on each tip of the left and right second focusing rods 52. The projection 54a of the female lead ring 54 is fitted into the groove 52c. Accordingly, the left and right second focusing rods 52 are moved in the optical axis direction L1, L2 together with the movement of the female lead ring 54 in the optical axis direction L1, L2. As a result, the left and right first focusing rods 51 respectively screwed with the left and right second focusing rods 52, the left and right connecting pins 14 respectively connected to the left and right first focusing rods 51, and the left and right focusing lens frames 13 respectively connected to the left and right connecting pins 14 are moved together with the focusing lenses 11, 21.

A spur gear 56 that teeth 56a are formed on the outer circumference thereof is provided on the eyepiece side tip of the male lead ring 55 (see FIG. 3). The focusing mechanism is composed of the male lead ring 55, the female lead ring 54, the left and right second focusing rods 52, the left and right first focusing rods 51, the left and right connecting pins 14, and the left and right focusing lens frames 13.

In this embodiment, the focusing operation portion composed of the focus knob 40 and a rotation shaft 41 is used as a diopter-adjustment-operation-preventing member for preventing an operation of the diopter adjustment wheel 53. The focus knob 40 is disposed on the same axis of the diopter adjustment wheel 53. The focus knob 40 is composed of a base portion 40a disposed to the eyepiece side of the male lead ring 55, and a cylinder portion 40b that is disposed outside of the diopter adjustment wheel 53 and extended in the optical axis direction from the outer edge of the base portion 40a. The rotation shaft 41 is rotatably held by the inner circumference of the second intermediate tube 57 centering on the axis MA, and movable in the optical axis direction L1, L2. The eyepiece side tip of the rotation shaft 41 integrally fitted to the base portion 40a of the focus knob 40. Accordingly, the focus knob 40 is rotatable centering on the axis MA, and movable in the optical axis direction L1, L2. A retaining screw 42 for preventing the focus knob 40 from coming out from the second intermediate tube 57 is screwed to the objective lens side tip of the rotation shaft 41.

An internal gear 58 having teeth 58a meshing with the teeth 56a of the spur gear 56 formed on the male lead ring 55 is formed on a surface that faces the male lead ring 55 and locates on the base portion 40a of the focus knob 40 (see FIG. 4). The focus operation portion for transmitting power to the focusing mechanism is composed of the focus knob 40, the internal gear 58, and the rotation shaft 41. The spur gear 56 can be meshed with the internal gear 58, or the meshed state is released by moving the focus knob 40 along the axis MA. Operation power can be transmitted from the focusing operation portion to the focusing mechanism by meshing the spur gear 56 with the internal gear 58. By releasing the meshed state between the spur gear 56 and the internal gear 58, power transmission from the focusing operation portion to the focusing mechanism is blocked. In this manner, in the present embodiment, a power-transmission-blocking mechanism for releasing the meshing state between the spur gear 56 and the internal gear 58 is composed of the rotation shaft 41, and the second intermediate tube 57, and the power-transmission-blocking mechanism becomes a focus-position-change-preventing member.

A plurality (three in the present embodiment) of concave portions 57a extending in the circumferential direction are formed on the inner circumference of the second intermediate tube 57 with a given space in the axial direction. A groove extending in the circumferential direction is formed on the outer circumference of the rotation shaft 41, and an O-ring 41a is fitted to the groove. The O-ring 41a protrudes from the outer circumference of the rotation shaft 41. The O-ring 41a can be put into the concave portion 57a by moving the focus knob 40 along the axis MA, so that the O-ring 41a is fitted to the concave portion 57a. The O-ring 41a and the concave portion 57a where the O-ring 41a is fitted compose a click mechanism, and the click mechanism becomes a position-keeping mechanism of the focus knob 40. With this click mechanism, the focus knob 40 can be positioned at three positions in the optical axis direction L1, L2. In the present embodiment, when the O-ring 41a is fitted to the concave portion 57a formed to the most objective lens side, the spur gear 56 is meshed with the internal gear 58. When the O-ring 41a is fitted to the other concave portions 57a, in other words, to the one formed to the most eyepiece side or the one formed intermediate position, the meshed state between the spur gear 56 and the internal gear 58 is released.

Then, the procedure for adjusting focus of the binoculars is explained. Incidentally, interpupillary adjustment is assumed to be carried out in advance.

At first, in order to adjust diopter difference between the left eye and the right eye of a user, the meshed state between the spur gear 56 of the male lead ring 55 and the internal gear 58 of the focus knob 40 is released by pulling out the focus knob 40 to the eyepiece direction (see FIG. 2). In this state, the O-ring 41a of the rotation shaft 41 is fitted to the concave portion 57a formed to the most eyepiece side of the second intermediate tube 57. In this instance, since the male lead ring 55 for moving the left and right focusing lenses 11, 21 together is not connected to the focus knob 40, even if the focus knob 40 is rotated the male lead ring 55 is not rotated, and the female lead ring 54 is not moved to the optical axis direction L1, L2, so that the focusing lenses 11, 21 are not moved.

When the meshed state between the spur gear 56 and the internal gear 58 is released, the operating knob 53b of the diopter adjustment wheel 53 is not covered by the cylinder portion 40b of the focus knob 40, and exposed. When the operating knob 53b is rotated, the diopter adjustment wheel 53 is rotated. The rotation of the diopter adjustment wheel 53 transmitted to the right second focusing rod 52 through the internal gear 53a formed on the inner circumference of the operation portion main body 53c and the gear 52b formed on the right second focusing rod, so that the right second focusing rod 52 rotates centering on the focusing axis FA.

The right second focusing rod 52 is restricted in movement in the optical axis direction L1, L2 by engaging with the projection 54a of the female lead ring 54. The depth of screwing of the right second focusing rod 52 with respect to the right first focusing rod 51 varies by the rotation of the right second focusing rod 52. In accordance with the depth of screwing, the right first focusing rod 51 and the right focusing lens frame 13 are moved in the optical axis direction L1, L2. As a result, the left and right diopter difference of the telescopic optical systems are adjusted corresponding to the left and right diopter difference of the left and right eyes of the user.

After that, the focusing lenses 11, 21 are moved for focusing.

At first, the focus knob 40 is pushed down to the objective lens side in the optical axis direction from the state shown in FIG. 2, and the spur gear 56 is meshed with the internal gear 58 (see FIG. 1). In this state, the O-ring 41a of the rotation shaft 41 is fitted to the concave portion 57a formed to the most objective lens side of the second intermediate tube 57. In this instance, the operating knob 53b of the diopter adjustment wheel 53 is covered by the focus knob 40. The focus knob 40 and the male lead ring 55 are connected through the spur gear 56 and the internal gear 58. Since the operating knob 53b is completely covered by the focus knob 40, the operating knob 53b is not touched by mistake, so that the diopter difference set previously does not change. Accordingly, after adjusting diopter difference, diopter difference can be prevented from being changed.

When the focus knob 40 is rotated, the male lead ring 55 is rotated through the internal gear 58 and the spur gear 56, and the female lead ring 54 is moved in the optical axis direction L1, L2. With the movement of the female lead ring 54 in the optical axis direction L1, L2, the left and right second focusing rods 52, the left and right first focusing rods 51, and the left and right focusing lens frames 13 are moved together in the optical axis direction L1, L2. In this instance, since the right second focusing rod 52 does not rotate centering on the focusing axis FA, the depth of screwing of the right second focusing rod 52 with respect to the right first focusing rod 51 does not change. Accordingly, the relative distance of the right first focusing rod 51 and the right second focusing rod 52 in the optical axis direction does not change.

As a result, the focusing lenses 11, 21 are moved together in the optical axis direction L1, L2, so that focusing on an object to be observed is carried out by the left and right telescopic optical systems at the same time. After that, the focus knob 40 is pulled out to the eyepiece side up to the intermediate position shown in FIG. 5, in other words, up to the position where the O-ring 41a of the rotation shaft 41 is fitted to the concave portion 57a located intermediate position among the three concave portions 57a of the second intermediate tube 57. When the meshed state between the spur gear 56 and the internal gear 58 by pulling out the focus knob 40 to this position, even if the focus knob 40 is touched by mistake, focus position does not change. Accordingly, after adjusting focal position the focal position is prevented from being changed.

Even in the state that the focus knob 40 is pulled up to the intermediate position as shown in FIG. 5, the operating knob 53b of the diopter adjustment wheel 53 is partially covered by the focus knob 40, so that the operating knob 53b is hardly touched by mistake, and the diopter difference can be prevented from being changed.

According to this embodiment, after adjusting diopter difference, the focus knob 40 is pushed down, so that the operating knob 53b cannot be touched. Accordingly, the diopter difference can be prevented from being changed after adjusting diopter difference. Moreover, after adjusting focus position by pulling out the focus knob 40, focus lock state that focus does not change can be created, so that focus position can be prevented from being changed after adjusting focus position. Furthermore, since the click mechanism is adopted for the position-keeping mechanism of the focusing operation portion, the focus knob 40 can be securely kept at a given position.

In the present embodiment, although the focus knob 40 is used as the diopter-adjustment-operation-preventing member, the operating knob 53b may be covered by a member (not shown) different from the focus knob 40 as the diopter-adjustment-operation-preventing member so as not to be touched by mistake.

When the diopter adjusting mechanism has a rotation shaft, it may have a lock mechanism for locking the rotation of the rotation shaft. As the lock mechanism, a holding member for blocking rotation of the rotation shaft may be used.

In the present embodiment, although the focus lock state is created by pulling up the focus knob 40, it may be created such that, for example, a lock mechanism (not shown) is provided on the focus knob 40, and the focus knob 40 is fixed to the second intermediate tube 57.

Furthermore, in the present invention, focus position can be locked even if the distance to the object to be observed is not near to infinity.

In the present embodiment, although the diopter adjustment mechanism and the focusing mechanism are provided on the bridge portion 30, the position where these mechanisms are provided is not limited to the bridge portion 30, it may be on the lens barrel 10, 20 or on the periphery thereof.

What is claimed is:

1. A pair of binoculars comprising:
   a pair of lens barrels each holding a telescopic optical system including a focusing lens;
   a diopter adjusting mechanism that adjusts diopter difference of one of the telescopic optical systems with respect to the other of the telescopic optical systems by moving the focusing lens of the one of the telescopic optical systems along an optical axis of the one of the telescopic optical systems;
   a diopter adjustment wheel that is not movable along the optical axis with respect to a body of the binoculars and includes an operation portion main body having a cylindrical shape and an operating knob provided on one end of the main body, and that moves the focusing lens of the one of the telescopic optical systems along the optical axis by a rotational operation of said operating knob about a rotational axis of the operating knob; and
   a diopter-adjustment-operation-preventing member that is provided on the same axis as the rotational axis of and radially outside the diopter adjustment wheel and adapted to move along the rotational axis to uncover or cover at least a portion of the operating knob and to make the diopter adjustment wheel either operable or inoperable.

2. The pair of binoculars according to claim 1, further comprising:
   a focusing mechanism for moving both of the focusing lenses held by the pair of lens barrels, respectively, along respective optical axes to determine a focus position of the telescopic optical system;
   a focusing operation portion that is movable, by operating the focusing mechanism, along the rotational axis of the diopter adjustment wheel between a first axial position to be mechanically coupled with the focusing mechanism, to move both of the pair of focusing lenses along the respective optical axes, and a second axial position to be released from the focusing mechanism; and
   a focus-position-change-preventing member that prevents the focus position of the telescopic optical system determined by the focusing mechanism from being changed.

3. The pair of binoculars according to claim 2, wherein the diopter-adjustment-operation-preventing member is the focusing operation portion.

4. The pair of binoculars according to claim 3, wherein the diopter-adjustment-operation-preventing member includes a position-keeping mechanism that keeps the focusing operation portion at one of said first axial position and said second axial position selectively.

5. The pair of binoculars according to claim 4, wherein the position-keeping mechanism in the diopter-adjustment-operation-preventing member is a click mechanism provided on the focusing operation portion and a member holding the focusing operation portion.

6. The pair of binoculars according to claim 2, further comprising:
a bridge portion that connects the pair of lens barrels by connecting portions extended from the pair of lens barrels, respectively;
wherein the focusing mechanism is provided on the bridge portion.

7. The pair of binoculars according to claim 2, wherein the focus-position-change-preventing member includes a power-transmission-blocking mechanism that blocks transmission of operational power from the focusing operation portion to the focusing mechanism.

8. The pair of binoculars according to claim 1, further comprising:
a bridge portion that connects the pair of lens barrels by connecting portions extended from the pair of lens barrels, respectively;
wherein a focusing mechanism for moving both of the focusing lenses in the pair of lens barrels is provided on the bridge portion.

9. A pair of binoculars comprising:
a pair of lens barrels each holding a telescopic optical system including a focusing lens;
a diopter adjusting mechanism that adjusts diopter difference of one of the telescopic optical systems with respect to the other of the telescopic optical systems by moving the focusing lens of the one of the telescopic optical systems along an optical axis of the one of the telescopic optical systems;
a diopter adjustment wheel that includes an operation portion main body having a cylindrical shape and an operating knob provided on one end of the main body, and that moves the focusing lens of the one of the telescopic optical systems along the optical axis by a rotational operation of said operating knob about a rotational axis of the operating knob;
a diopter-adjustment-operation-preventing member that is adapted to uncover or cover at least a portion of the operating knob by moving along the rotational axis to make the diopter adjustment wheel either operative or inoperative;
a focusing mechanism for moving both of the focusing lenses held by the pair of lens barrels, respectively, along respective optical axes;
a focusing operation portion that moves both of the pair of focusing lenses along the respective optical axes by operating the focusing mechanism by a rotational operation; and
a focus-position-change-preventing member that prevents a focus position of the telescopic optical system determined by the focusing mechanism from being changed,
wherein the focus-position-change-preventing member includes a position-keeping mechanism that keeps the focusing operation portion at a given position among a plurality of positions along the optical axes.

10. The pair of binoculars according to claim 9, wherein the position-keeping mechanism in the focus-position-change-preventing member is a click mechanism provided on the focusing operation portion and a member holding the focusing operation portion.

11. A pair of binoculars comprising:
a pair of lens barrels each holding a telescopic optical system including a focusing lens;
a diopter adjusting mechanism that adjusts diopter difference of one of the telescopic optical systems with respect to the other of the telescopic optical systems by moving the focusing lens of the one of the telescopic optical systems along an optical axis of the one of the telescopic optical systems;
a diopter adjustment wheel that is not movable along the optical axis with respect to a body of the binoculars and includes an operation portion main body having a cylindrical shape and an operating knob provided on one end of the main body, and that moves the focusing lens of the one of the telescopic optical systems along the optical axis by a rotational operation of the diopter adjustment wheel about a rotational axis of the operating knob;
a diopter-adjustment-operation-preventing member that makes the diopter adjustment wheel either operable or inoperable, and
wherein the diopter adjustment-operation-preventing member is provided on the same axis as the rotational axis of and radially outside the diopter adjustment wheel and adapted to move along the rotational axis to cover at least a portion of the operating knob to prevent the rotational operation of the diopter adjustment wheel.

12. The pair of binoculars according to claim 11, further comprising:
a focusing mechanism for moving both of the focusing lenses held by the pair of lens barrels, respectively, along respective optical axes;
a focusing operation portion that moves both of the pair of focusing lenses along the respective optical axes by a rotational operation of the focusing operation portion; and
wherein the diopter adjustment-operation-preventing member comprises the focusing operation portion.

13. Binoculars having a focus adjustment knob and a diopter adjustment knob rotatable about a common axis,
wherein the diopter adjustment knob includes an operation portion main body having a cylindrical shape and an operating knob provided on one end of the main body, the diopter adjustment knob being not movable along the common axis with respect to a body of the binoculars,
wherein the focus adjustment knob is provided with a hollow cylindrical portion having a larger diameter than the diopter adjustment knob and adapted to move along the common axis with respect to the diopter adjustment knob to a position at which rotation of the diopter adjustment knob is prevented.

14. The binoculars according to claim 13, wherein the focus adjustment knob is movable along the common axis to a position at which rotation of the focus adjustment knob is prevented.

15. Binoculars having a diopter adjustment knob rotatable for diopter adjustment and a focus adjustment knob rotatable about a common axis, the focus adjustment knob being formed with a hollow cylindrical portion having a larger diameter than the diopter adjustment knob and adapted to move along the common axis between a first axial position at which the focus adjustment knob is operative for focus adjustment and covers at least a portion of the diopter adjustment knob so as to prevent rotation of the diopter adjustment knob, whereby a diopter adjustment can be maintained, and a second axial position at which the diopter adjustment knob is uncovered to effect diopter adjustment and the focus adjustment knob is inoperative for focus adjustment.

16. The binoculars according to claim 15, wherein the focus adjustment knob is adapted to be locked in position to maintain a focus adjustment.

* * * * *